United States Patent

[11] 3,562,407

| [72] | Inventor | Robert E. Beebe |
| | | 2050 N. 94th St., Omaha, Nebr. 68134 |
| [21] | Appl. No. | 817,413 |
| [22] | Filed | Apr. 18, 1969 |
| [45] | Patented | Feb. 9, 1971 |

[54] HEIGHT-ADJUSTABLE, INSULATING COLLAR CLIP FOR ANCHORING WIRE TO ELECTRIC LIVESTOCK FENCE POSTS
6 Claims, 5 Drawing Figs.

[52] U.S. Cl. .................................... 174/175,
174/161, 174/163
[51] Int. Cl. ....................................... H01b 17/16,
A01k 3/00
[50] Field of Search ............................ 174/45,
158.2, 161, 161.2, 163.2, 174, 175, 201; 256/10;
24/129.2, 257, (Inquired); 248/70, 221, 295,
(Inquired)

[56] References Cited
UNITED STATES PATENTS
D210,729  4/1968  Epp ....................... 174/163(.2)UX
FOREIGN PATENTS
149,709   1/1953   Australia .................. 174/158(.2)
1,249,516 11/1960  France ..................... 174/158(.2)
754,239   8/1956   Great Britain ............. 174/158(.2)

*Primary Examiner* — Laramie E. Askin
*Attorney* — Henderson & Strom

ABSTRACT: This invention provides a novel insulating collar clip, for retaining the electric wire, which collar clip is positioned on the livestock fence post by forcing it down around the outside surface of the post, and is adjustably movable up and down the post with manual force so as to humanely contain livestock of various sizes and ages within the perimeter of said electric fence; this, without requiring multiple strands of wire, or resetting of fence posts to various heights.

PATENTED FEB 9 1971

3,562,407

INVENTOR.
ROBERT E. BEEBE
BY
Henderson & Strom
ATTORNEYS

HEIGHT-ADJUSTABLE, INSULATING COLLAR CLIP FOR ANCHORING WIRE TO ELECTRIC LIVESTOCK FENCE POSTS

Fences that are currently used to contain livestock, or to prohibit livestock from entering grain-producing areas, are basically of a multiple-strand barbed wire type, or a single-strand electric wire variety. The well known barbed wire fence accomplishes the containment of livestock of various sizes by using a number of strands at various heights. The basic objections to this type of fence are its excessive cost per foot of containment. When the relatively high cost of three strands of more costly wire is added to the higher labor cost of setting posts, stretching and tightening multiple strands, and restretching at frequent intervals, the total cost picture is relatively steep. Additionally, this kind of fence can be breached by intermediate size animals, a fact that can be attested to by anyone who drives farm roads.

The many single-strand electric fences currently available for use are of the fixed and the adjustable height varieties. These all basically make use of the iron or steel post, with various types of insulator devices to retain the wire. The objections to the fixed height variety are obviously concerned with its lack of adaptability to animals of various sizes. The objectionable aspects of the current adjustable height systems resides in the construction and design of the insulator, which makes shorting a hazard, and the finger pressure and manipulation that is required to slide them up and down the fence post. These insulators are of two basic kinds. The most common uses a curved steel band, to which is attached a plastic or porcelain insulator. There are circular holes in the steel band, near the tips. When the ends of the steel band are compressed toward each other, the holes align to allow them to be slid down around the fence post. When the compressing force is relaxed, allowing the ends of the steel bands to spring apart, the holes wedge tightly on the post, thus retaining the insulator in a set position. The other form of insulator involves an appropriately shaped collar that fits down around the post, and is held in a set position by a wing nut. In both types, considerable pressure and work is involved in adjusting insulator height, particularly when it is realized that hundreds of units must be squeezed or loosened-tightened to effect a reasonable length of fence. Additionally, both types, due to their construction, tend to short out relatively easily. The band type causes the moisture and debris of the field quickly builds up a deposit of moist material along the band, and to the insulator. Several of these, and the fence blows. The same is true of the wing nut variety, since the distance across the collar to the wire is very short.

The only logical answer, then, would seem to call for an electric fence system that eliminated the costly, per unit materials and insulators, reduced the tendency of insulators to easily short out with the accumulation of field debris and moisture, and offered a very simple unit, of low cost, that provided easy and fast adjustability of wire height.

In this regard, an economical, wire-retaining collar clip that may be adjustably moved up and down a post quickly and easily, and yet remain firmly in the position at which it is placed, is desired.

It is accordingly an object of this invention to provide an electric fence system that may be easily economically and quickly installed, with an equally economical, insulating, wire-retaining collar clip that may be adjusted upwardly and downwardly on the fence post.

It is another purpose of this invention to provide an electric fence system in which the insulating collar clip surrounds the post and encompasses it and slides up and down said post, yet always exerting sufficient tension against the sidewalls of the post to retain the position at which it is placed, thus to allow positioning of wire height to the level desired.

It is another purpose of this invention to provide an adjustable height, wire-retaining clip which is also an insulator.

It is yet another purpose of this invention to provide an adjustable height, wire-retaining collar clip that retains its position on a fence post by a tension system that is inherent in the design and materials used, and does not require metal bands or wing nuts.

It is still another purpose of this invention to provide an adjustable height, wire-retaining collar that permits said wire to be quickly and easily attached to said collar by having, as a part of said collar a simple clip device.

It is still another purpose of this invention to provide an adjustable wire height fence system in which post and adjustable height wire-retaining clip can be made of simple, economical materials that provide necessary insulation, while reducing costs materially.

In the drawings, wherein like numbers refer to like parts in the several views, and in which.

Figure 1:
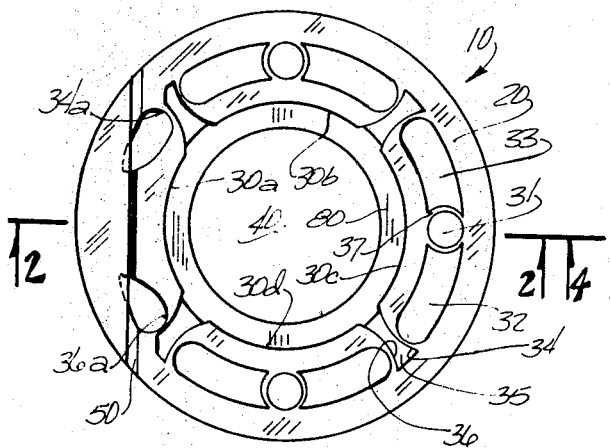
FIG. 1 is a top plan view of the proposed collar clip. A portion of the post, around which it is to be positioned is also shown.
Figure 3:
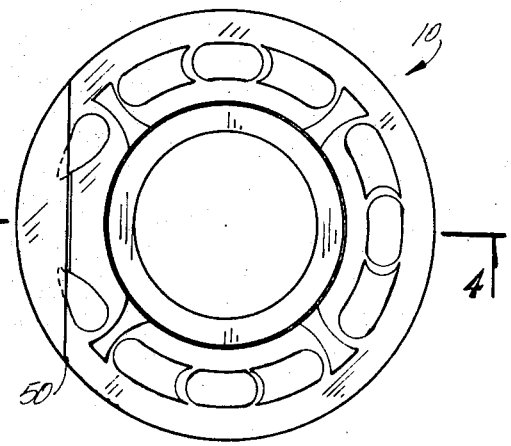
FIG. 3 is a top plan view of the collar clip, with the interior walls compressed outwardly by the post, which has been inserted into the center of the collar clip.
Figure 2:
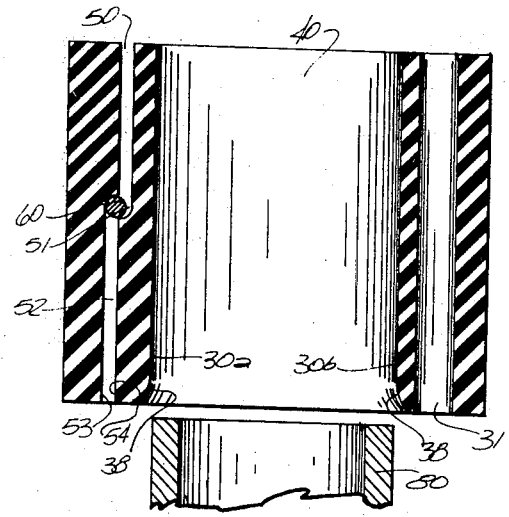
FIG. 2 is a sectional elevation view of the collar clip and post, taken along line 2–2 of FIG. 1.
Figure 4:
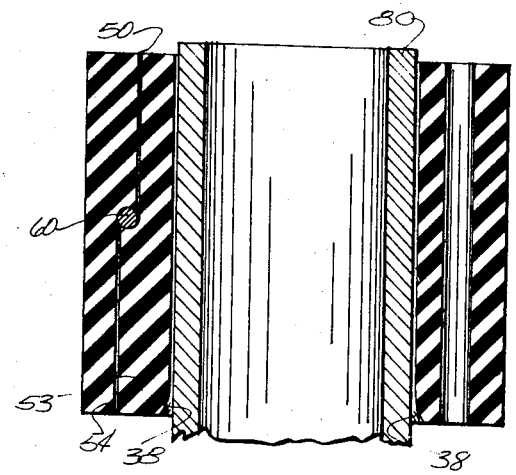
Figure 5:
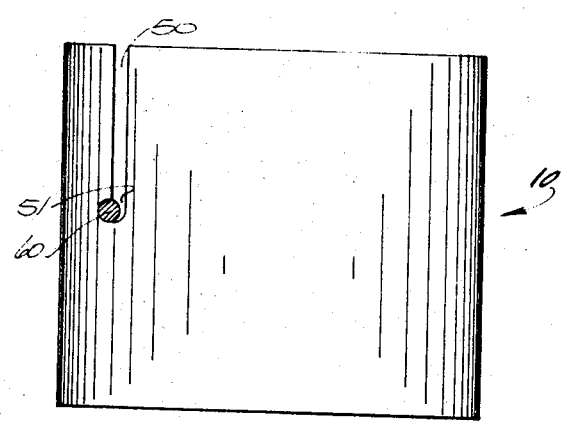

FIG. 4 is a sectional elevational view of the collar clip embodiment 10 and the post taken along line 4–4 of FIG. 3; and FIG. 5 is a side elevational view of the collar clip embodiment 10, showing the wire-retaining slot 50 as it would appear in the side walls that it breaches.

The height-adjustable insulating collar clip embodiment 10 is readily employed in conjunction with a post member 80, said post member 80 being relatively uniform in horizontal cross-sectional shape from top to bottom. Said post 80, being of sufficient length, is driven into the ground to firmly implace and imbed it therein, so that it will stand vertical to the ground, and will generally resist the normal pressures to dislodge it from solid ground. It is on and around post 80 that the collar device is forcibly positioned.

The embodiment of the adjustable height, wire-retaining insulating collar clip device as seen in the appended drawings, comprises a cylinder of dimensionally stable, relatively non-stretchable plastic or other resilient material, of some necessary vertical height, which is self-adaptable to allow its center diameter to be enlarged under outward pressure, without stretching its basic outer wall 20, to accommodate the entrance into its smaller center diameter of a post unit 80, which post unit 80 has an outer diameter somewhat larger than the collar opening 40. The above is accomplished by having a dimensionally stable outer retaining wall 20 to which is attached, and a part thereof, a series of hollow veinlike tubes 31, 32, 33 at its inner surface, and running relatively vertically to said wall 20, said hollow tubes or spaces separating noncontinuous compression surfaces 30a, 30b, 30c and 30d from the retaining wall 20, and being formed by said interiorly facing, nonconnected compression surfaces and by thin, distortable or bowable side walls 34, 36 and 37 which connect said compression surfaces to the outer wall 20. Said veinlike structures 31, 32 and 33, and their compression surfaces 30a, b, c, d are separated by vertically running slots 35 which break the inner compression surface at regular intervals. Thus, when sufficient pressure is exerted against the compression surfaces 30a, 30b, 30c and 30d in an outwardly direction, thin sidewalls 34, 36 and 37 bow outwardly to the sides allowing said compression surfaces to move toward the retaining wall 20, yet under return pressure. The veinlike tubes, in a sense, collapse under outward pressure so as to allow a larger element to be forced between them.

At one side or quadrant of collar 10 is a vertically oriented, wire-retaining slot or clip 50. Slot 50 runs vertically downward, and merges into a dogleg 51 which forms the retaining area for wire 60. Said wire 60 runs horizontally thru slot arrangement 50. The slot arrangement 50, in the retaining wall 20 terminates at dogleg 51, but continues downwardly in the interior area in the form of slot 52. In the interior construction of clamp 10, then, slot 50, dogleg 51 and slot 52 form a continuous slot from top to bottom, in which sidewalls 53 and 54 are relatively equidistant apart. When outward pressure is exerted against compression surface 30a, sufficient to bend or bow vein sidewalls 34a and 36a, said compression surface 30a moves outwardly toward retaining wall 20, and slot walls 53 and 54 are forced together closing slot 50–51–52 and locking wire 60 in place.

Near the bottom edge of center opening 40 the compression surfaces 30a, 30b, 30c and 30d have an outwardly curve 38 which adapts the smaller diameter of hole 40 to the larger diameter of the post 80. This slight adaption allows for easier insertion of post 80 into the center hole 40 of the collar clip 10.

In summation, as post 80 is inserted into the bottom of center hole 40 of collar clip 10, and is forced upward into and thru said hole 40, the compression surfaces 30a, 30b, 30c 30d are forced resiliently outwardly as the thin sidewalls 34, 36, and 37 bow and distort under the outward pressure. But since the material is resilient to distortion, the said compression surfaces continue to exert a substantial pressure against the outer walls of post 80. As a result, collar clip 10 will retain a set position on the post 80, but may, additionally, be moved to a new position on the post 80 by manual force.

I claim:

1. A collar clip for supporting a strand of wire on a post, the collar clip comprising:
   a collar;
   a plurality of arcuately spaced, resilient, longitudinally disposed tubes secured to the inner surface of said collar and projecting towards the axis thereof;
   said tubes defining a passage disposed axially within said collar and adapted to slidably and frictionally receive a fence post having an outside diameter greater than the diameter of said passage, wherein upon mounting said collar on the post, said tubes will be deformed, thus enlarging said passage; and
   clip means secured to the outer surface of said collar for receiving and holding a wire.

2. A collar clip as defined in claim 1 wherein said tubes are substantially spaced about the interior wall of the collar and whose walls define a substantially cylindrical axial passage.

3. A collar clip as defined in claim 2 wherein said tubes are made of a material which is a nonconductor of electricity.

4. A collar clip as defined in claim 2 wherein said collar is made of a material which is a nonconductor of electricity.

5. A collar clip as defined in claim 4 wherein the lower edge of said tube walls defining said axial passage is beveled outwardly to create a slightly larger diameter, thereby allowing an easier insertion of a post into the axial passage.

6. A collar clip as defined in claim 5 wherein said clip means comprises to two L-shaped members, each having a base element secured to the periphery of said collar and a free element extending substantially parallel to said collar axis, said base elements being both radially and vertically offset, and said free elements having their open ends disposed in opposite directions, thereby defining a passage to receive a wire, said passage extending between said collar outer wall, said base elements, and said free elements, respectively; the wire being insertable by successively placing a portion between said free element and said collar outer wall.